(12) United States Patent
Iseki

(10) Patent No.: US 8,693,033 B2
(45) Date of Patent: Apr. 8, 2014

(54) IMAGE FORMING APPARATUS, IMAGE FORMING METHOD AND COMPUTER-READABLE MEDIUM

(75) Inventor: Tomoharu Iseki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 375 days.

(21) Appl. No.: 12/888,969

(22) Filed: Sep. 23, 2010

(65) Prior Publication Data
US 2011/0235102 A1 Sep. 29, 2011

(30) Foreign Application Priority Data

Mar. 25, 2010 (JP) .................................. 2010-070750

(51) Int. Cl.
G06F 3/12 (2006.01)
G06F 15/00 (2006.01)
G06K 11/00 (2006.01)

(52) U.S. Cl.
USPC ............................ 358/1.15; 358/1.9; 358/1.12

(58) Field of Classification Search
CPC ............. G06F 15/1825; H04N 1/3875; H04N 2201/0414
USPC ............... 358/1.1, 1.9, 1.11, 1.12, 1.13, 1.14, 358/1.15, 1.16, 1.17, 1.18
See application file for complete search history.

(56) References Cited

U.S. PATENT DOCUMENTS

2004/0125390 A1* 7/2004 Miki ............................. 358/1.9
2010/0171975 A1* 7/2010 Purnomo ..................... 358/1.15

FOREIGN PATENT DOCUMENTS

| JP | 04-260273 A | 9/1992 |
| JP | 05-328102 A | 12/1993 |
| JP | 07-058941 A | 3/1995 |

* cited by examiner

*Primary Examiner* — Thierry L Pham
(74) *Attorney, Agent, or Firm* — Sughrue Mion, PLLC

(57) ABSTRACT

An image forming apparatus includes an image forming unit and a control unit. The image forming unit forms an image on a print medium. The control unit controls the image forming unit so as to divide an image larger than the print medium into pieces and to form the image pieces on a plurality of print media. The control unit forms an image formed on a different print medium in a margin where the image is not formed when the print medium contains the margin in case that the image forming unit divides the image into pieces and forms the image pieces on the plurality of print media.

14 Claims, 13 Drawing Sheets

IMAGE SIZE AFTER SCALE UP

X

Y

NUMBER OF SHEETS OF ONE
SIDE OF OUTPUT SHEET m n

SHEET SIZE WHEN OUTPUT SHEETS ARE ARRANGED = m∗x∗n∗y
NUMBER OF USED SHEETS = m∗n

SHEET SIZE

NUMBER OF USED SHEETS IS CALCULATED
ORDINARY NUMBER OF USED SHEETS = m*n
NUMBER OF USED SHEETS IN (A) = m*(n-1)

NUMBER OF USED SHEETS IS CALCULATED
ORDINARY NUMBER OF USED SHEETS = m*n
NUMBER OF USED SHEETS IN (B) = n*(m-1)

MOVE COORDINATES ARE
CALCULATED (SOURCE → DESTINATION)
(A) START POINT (0, Y-Yb) → (m*x, 0)
END POINT (X, Y) → (m*x-Yb, X)
(B) START POINT (X-Xb, 0) → (0, n*y)
END POINT (X, Y) → (Y, n*y-Xb)

FIG. 19

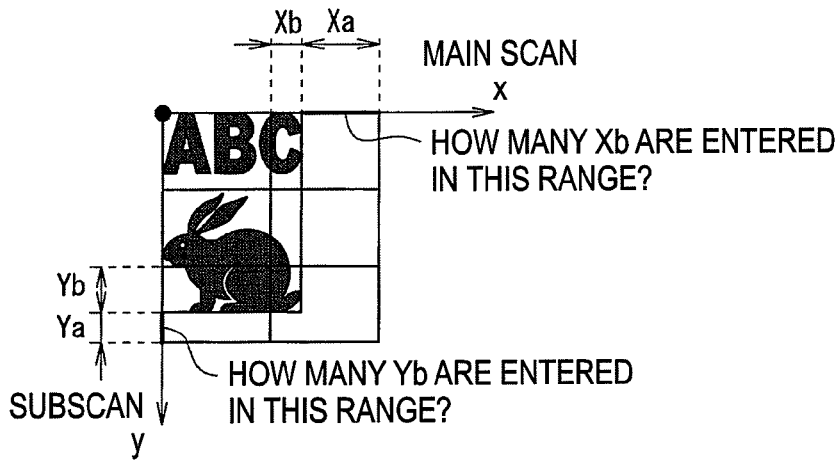

WHEN NOT ENTERED ACCORDING TO METHOD DESCRIBED ABOVE

HOW MANY Xb ARE ENTERED IN THIS RANGE?

HOW MANY Yb ARE ENTERED IN THIS RANGE?

NUMBER OF IMAGES THAT CAN BE MOVED TO SHEET CONTAINING MARGIN IS CALCULATED
Px = Xa/Xb (FRACTIONAL PORTION IS DROPPED)
Py = Ya/Yb (FRACTIONAL PORTION IS DROPPED)

FIG. 20

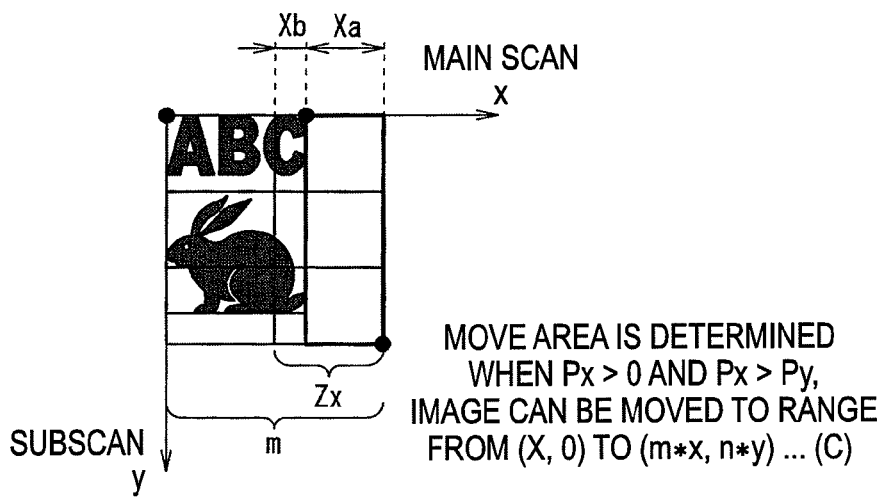

MOVE AREA IS DETERMINED WHEN Px > 0 AND Px > Py, IMAGE CAN BE MOVED TO RANGE FROM (X, 0) TO (m∗x, n∗y) ... (C)

NUMBER OF SHEETS ON WHICH MOVE IMAGE IS PLACED IS CALCULATED
(C) Zx = n/(Px+1) (FRACTIONAL PORTION IS ROUNDED UP)

NUMBER OF USED SHEETS
(C) m∗n-(n-Zx)

FIG. 21

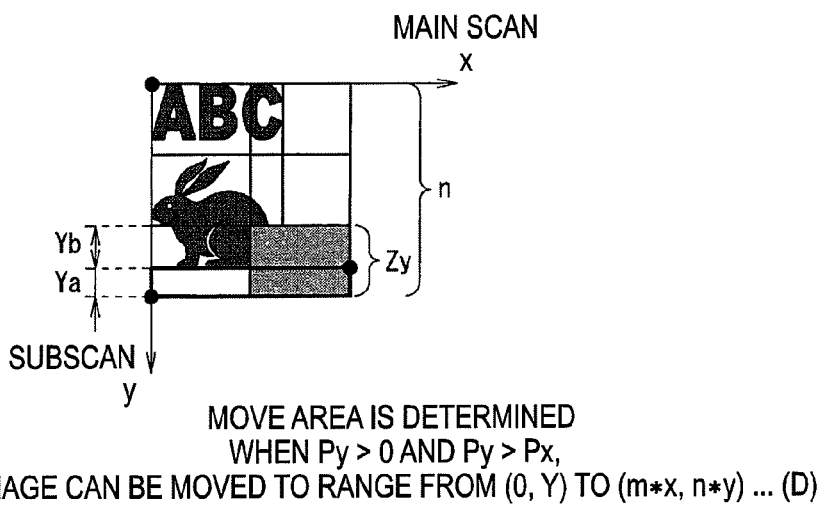

MOVE AREA IS DETERMINED
WHEN Py > 0 AND Py > Px,
IMAGE CAN BE MOVED TO RANGE FROM (0, Y) TO (m∗x, n∗y) ... (D)

NUMBER OF SHEETS ON WHICH MOVE IMAGE IS PLACED IS CALCULATED
(D) Zy = m/(Py+1) (FRACTIONAL PORTION IS ROUNDED UP)

NUMBER OF USED SHEETS
(D) m∗n-(m-Zy)

FIG. 22

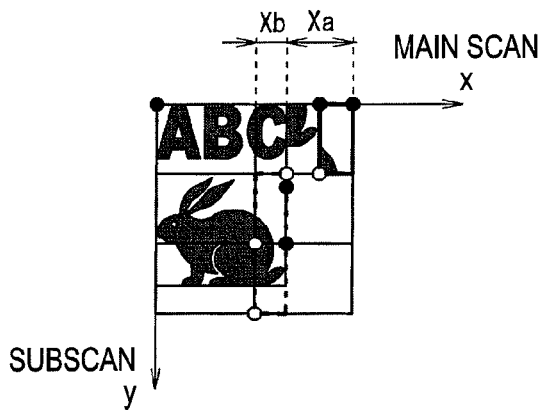

MOVE COORDINATES ARE CALCULATED (SOURCE → DESTINATION)
s = 0, 1, ..., Zx-1
(C) START POINT (X, (s+1)∗y) → (m∗x-(s mod Px)∗Xb, ((s-(s mod Px))/Px)∗y)
END POINT (X-Xb, ((s+1)∗y)+y) → (m∗x-((s mod Px)+1)∗Xb, (s-(s mod Px))/Px+1)∗y)

MOVE COORDINATES ARE CALCULATED
s = 0, 1, ..., Zy-1
(D) START POINT ((s+1)∗x, Y) → (((s-(s mod Py))/Py)∗x, n∗y-(s mod Py)∗Yb)
END POINT (((s+1)∗x)+x, Y-Yb) → ((s-(s mod Py))/Py+1)∗x, ((n∗y-(s mod Py)+1)∗Yb)

FIG. 23

WHEN IMAGE SURROUNDED BY MARGINS IN MAIN SCAN
DIRECTION AND SUBSCAN DIRECTION REMAINS

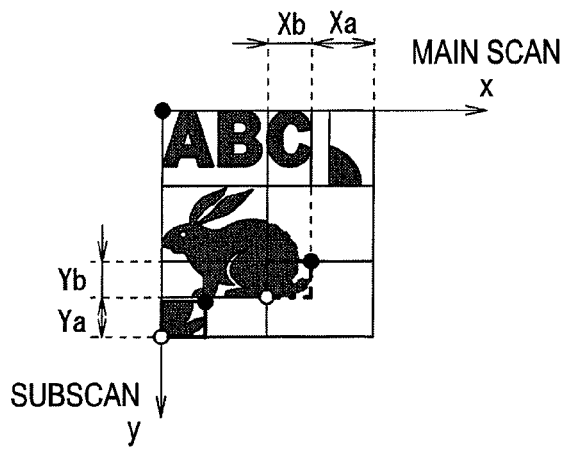

NUMBER OF IMAGES THAT CANNOT BE MOVED IS CALCULATED
(C) $n-Zx-(Px*Zx) > 0$

CAN IMAGE SURROUNDED BY MARGINS IN MAIN SCAN
DIRECTION AND SUBSCAN DIRECTION BE MOVED?
(C) $Ya > Y+(1-n)*y$

MOVE RANGE IS CALCULATED
IMAGE SURROUNDED BY MARGINS IN MAIN SCAN DIRECTION AND
SUBSCAN DIRECTION IS CALCULATED TO FOLLOWING COORDINATES
IN (C), IMAGE CAN BE MOVED TO RANGE FROM (X-Xb, Y) TO (0, n*y) ... (E)

MOVE COORDINATES ARE CALCULATED (SOURCE → DESTINATION)
(E) START POINT $(X, (n-1)*y) \rightarrow (Xb, n*y-Yb)$
END POINT $(X-Xb, Y) \rightarrow (0, n*y)$ NUMBER OF IMAGES THAT CANNOT BE MOVED IS CALCULATED
(D) $m-Zy-(Py*Zy) > 0$ CAN IMAGE SURROUNDED BY MARGINS IN MAIN SCAN
DIRECTION AND SUBSCAN DIRECTION BE MOVED?
(D) $Xa > X+(1-m)*x$ MOVE RANGE IS CALCULATED
IMAGE SURROUNDED BY MARGINS IN MAIN SCAN DIRECTION AND
SUBSCAN DIRECTION IS CALCULATED TO FOLLOWING COORDINATES
IN (D), IMAGE CAN BE MOVED TO RANGE FROM (X, Y-Yb) TO (m*x, 0) ... (F)

MOVE COORDINATES ARE CALCULATED (SOURCE → DESTINATION)
(F) START POINT $((m-1)*x, Y) \rightarrow (m*x-Xb, Yb)$
END POINT $(X, Y-Yb) \rightarrow (m*x, 0)$

IMAGE FORMING APPARATUS, IMAGE FORMING METHOD AND COMPUTER-READABLE MEDIUM

CROSS-REFERENCE TO RELATED APPLICATION

This application is based on and claims priority under 35 USC119 from Japanese Patent Application No. 2010-070750 filed on Mar. 25, 2010.

BACKGROUND

Technical Field

This invention relates to an image forming apparatus, an image forming method and a computer-readable medium.

SUMMARY

According to an aspect of the invention, an image forming apparatus includes an image forming unit and a control unit. The image forming unit forms an image on a print medium. The control unit controls the image forming unit so as to divide an image larger than the print medium into pieces and to form the image pieces on a plurality of print media. The control unit forms an image formed on a different print medium in a margin where the image is not formed when the print medium contains the margin in case that the image forming unit divides the image into pieces and forms the image pieces on the plurality of print media.

BRIEF DESCRIPTION OF THE DRAWINGS

Exemplary embodiments of the invention will be described in detail based on the following figures, wherein:

FIG. 19 is a schematic representation to describe the move image determination processing in the image forming apparatus of the embodiment of the invention;

FIG. 20 is a schematic representation to describe the move image determination processing in the image forming apparatus of the embodiment of the invention;

FIG. 21 is a schematic representation to describe the move image determination processing in the image forming apparatus of the embodiment of the invention;

FIG. 22 is a schematic representation to describe the move image determination processing in the image forming apparatus of the embodiment of the invention; and FIG. 23 is a schematic representation to describe the move image determination processing in the image forming apparatus of the embodiment of the invention.

DETAILED DESCRIPTION

Figure 1:
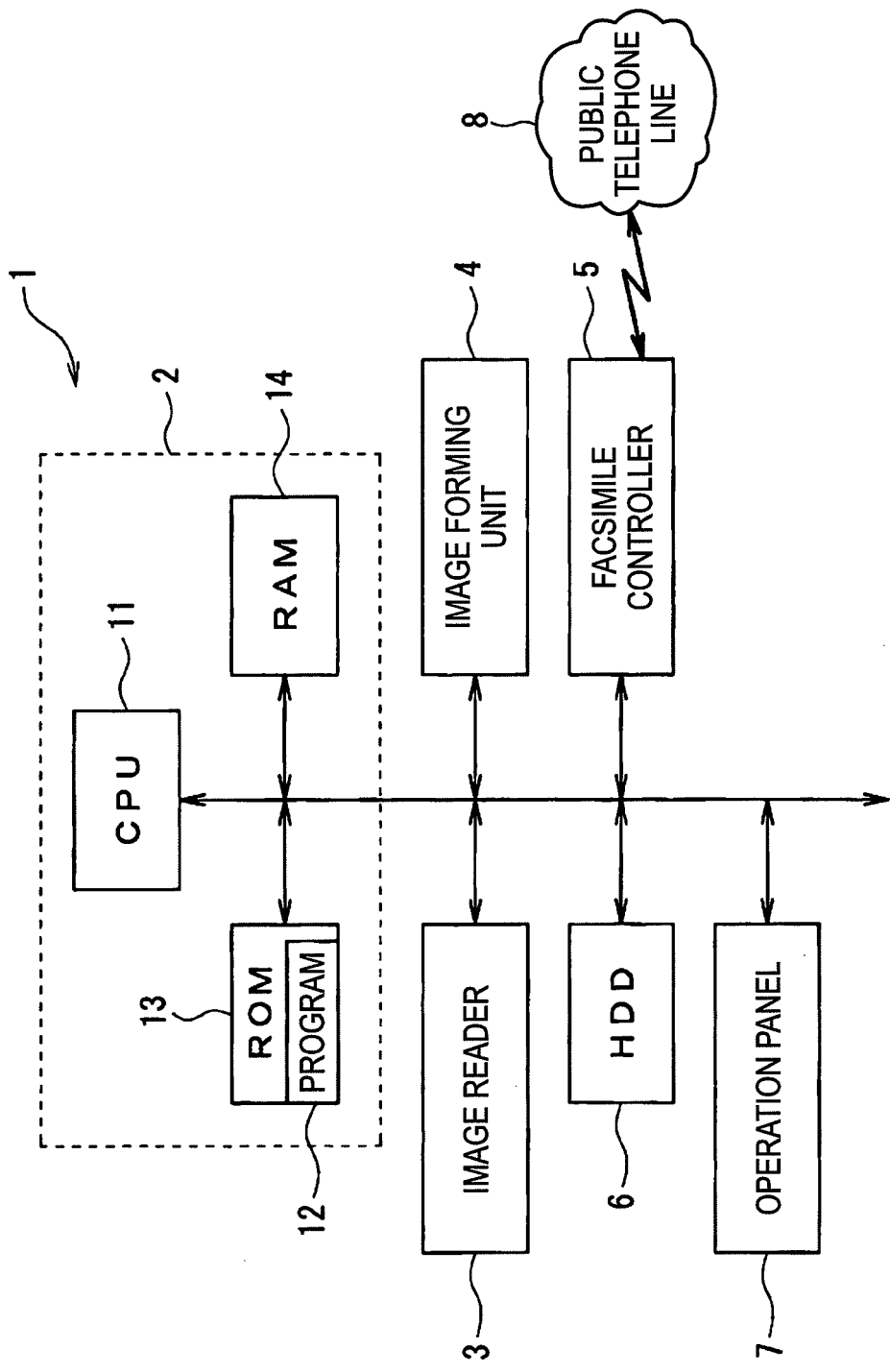
FIG. 1 is a block diagram to show electric connection of an image forming apparatus of an embodiment of the invention.

FIG. 1 is a block diagram to show electric connection of an image forming apparatus of an embodiment of the invention. An image forming apparatus 1 includes a main control section 2 for concentratedly controlling the whole apparatus, an image reader 3 for reading an image of a document, an image forming unit 4 for forming an image based on image data of the image, etc., of the document read through the image reader 3, a facsimile controller 5 for transmitting and receiving facsimile data to and from a public telephone line 8, magnetic storage (HDD) 6 for storing various pieces of data of the image data, etc., and an operation panel for accepting various types of operation from the user and displaying various messages.

The main control section 2 includes a CPU 11 for concentratedly controlling the sections, ROM 13 storing a control program 12 executed by the CPU 11 and various pieces of fixed data, and RAM 14 used as a work area of the CPU 11.

The control program 12 is set up from the beginning of manufacturing the image forming apparatus 1, but may be later downloaded through a communication unit of the Internet, etc., and be set up or may be later read from a storage medium storing the control program 12 and be set up.

The image forming apparatus 1 includes a "scale-up continuous print" function. This function is a function of scaling up a document image and forming an image larger than a print medium (sheet) of an ordinary standardized size. That is, one image is more than a sheet of a standardized size and thus an image is divided into pieces and image pieces are formed on sheets and the sheets on which the image pieces are formed are collected into one scaled-up image.

In this case, one large image is divided into a plurality of sheets to form the image and thus a large margin portion where no image is formed may occur in the sheets and the sheet wastes.

As means for preventing such a sheet waste, when a document image is scaled up and image pieces are allocated to a plurality of sheets, if a blank sheet where no image is formed occurs, it is considered that the sheet is not output.

If orientation of each sheet is rotated 90° and a blank sheet where no image is formed occurs, it is also considered that an image is formed in the orientation of the sheets and a blank sheet where no image is formed is not output.

In the sheets where the image is formed according to the means, a sheet where an image is formed in a part and a blank portion occurs in other portions can occur. If the blank portion is utilized effectively and an image to be formed on another sheet is moved to the blank portion to form the image, it is made possible to further prevent a sheet waste.

Figure 2:
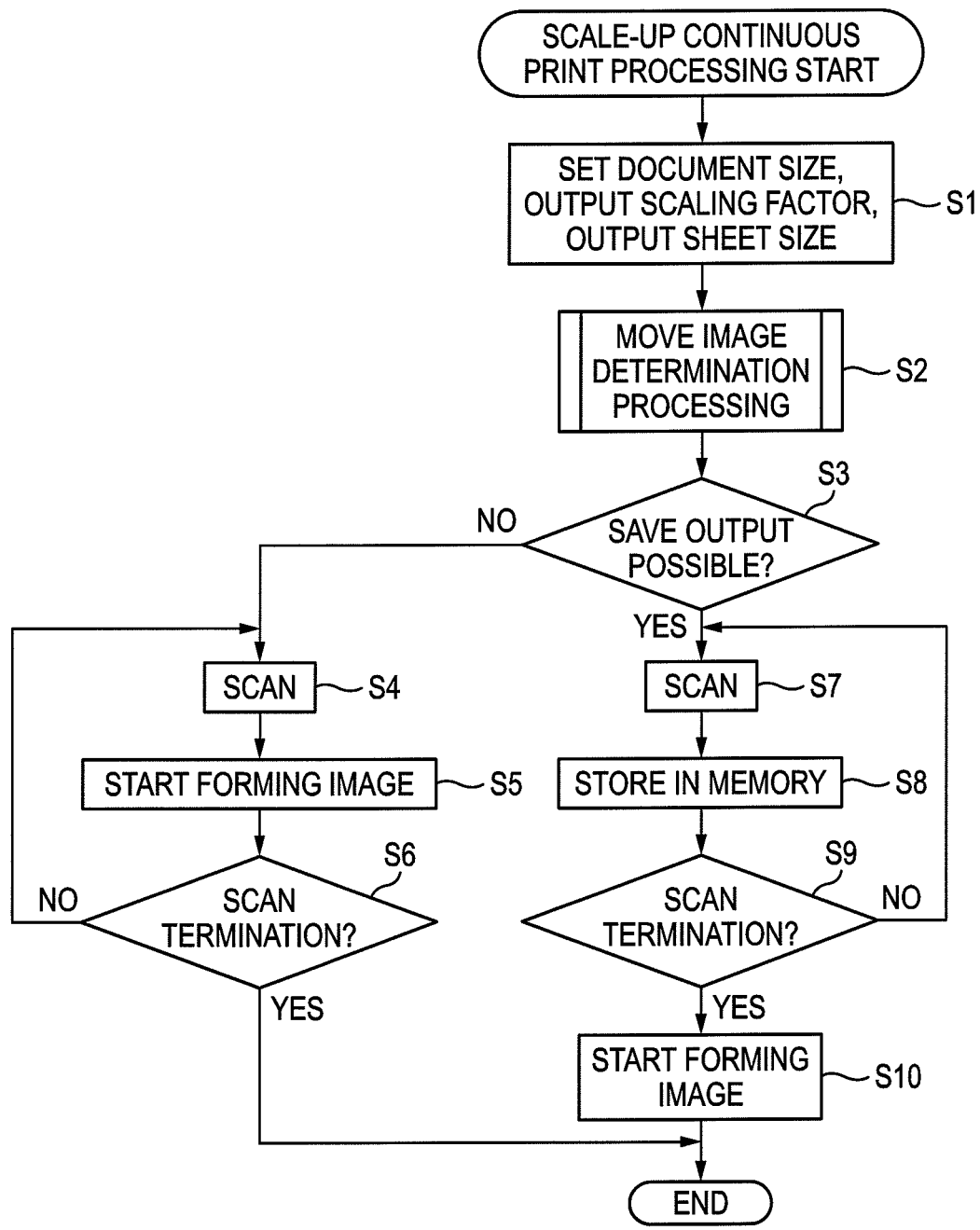
FIG. 2 is a flowchart to of scale-up continuous print processing in the image forming apparatus of the embodiment of the invention.
Figure 3:
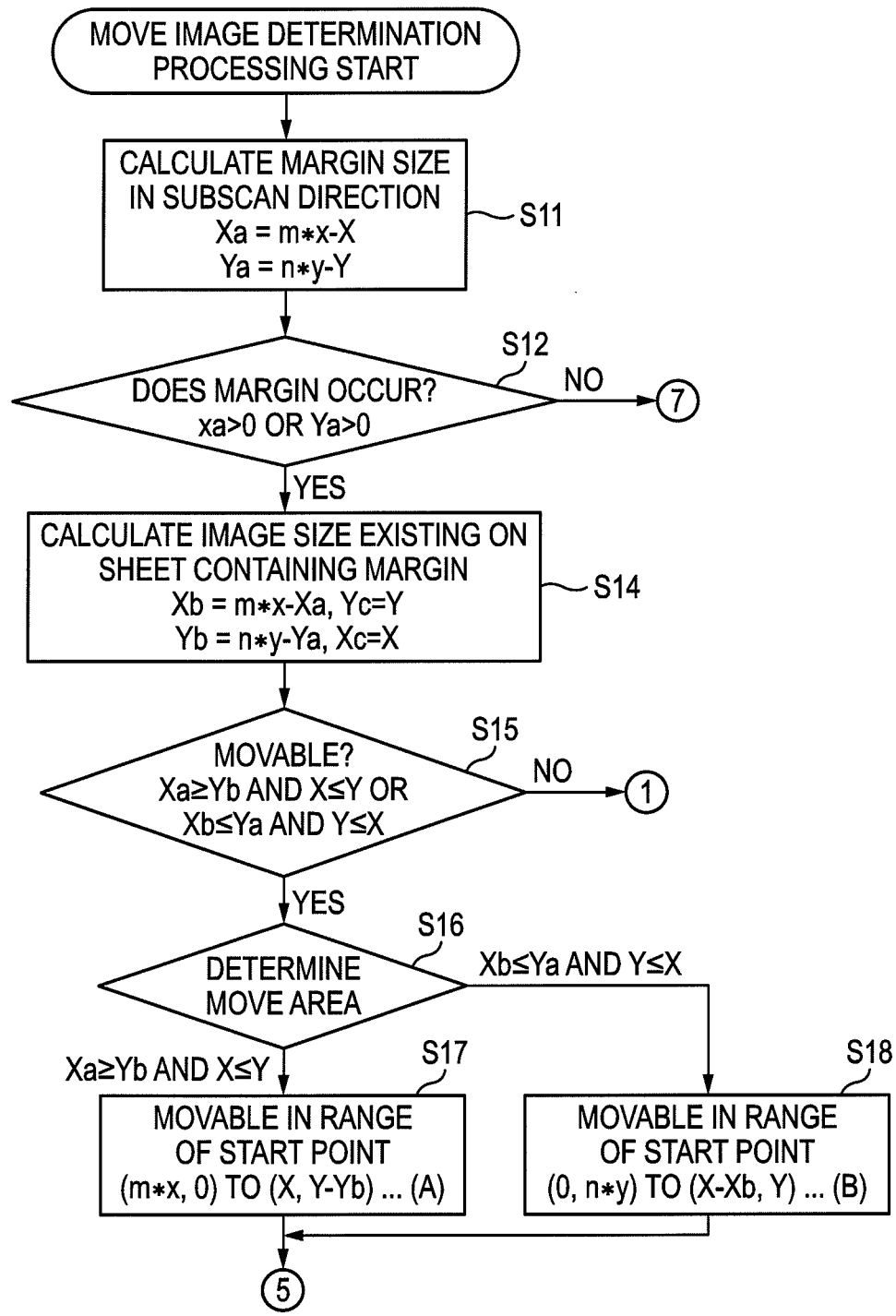
FIG. 3 is a flowchart of move image determination processing in the image forming apparatus of the embodiment of the invention.
Figure 4:
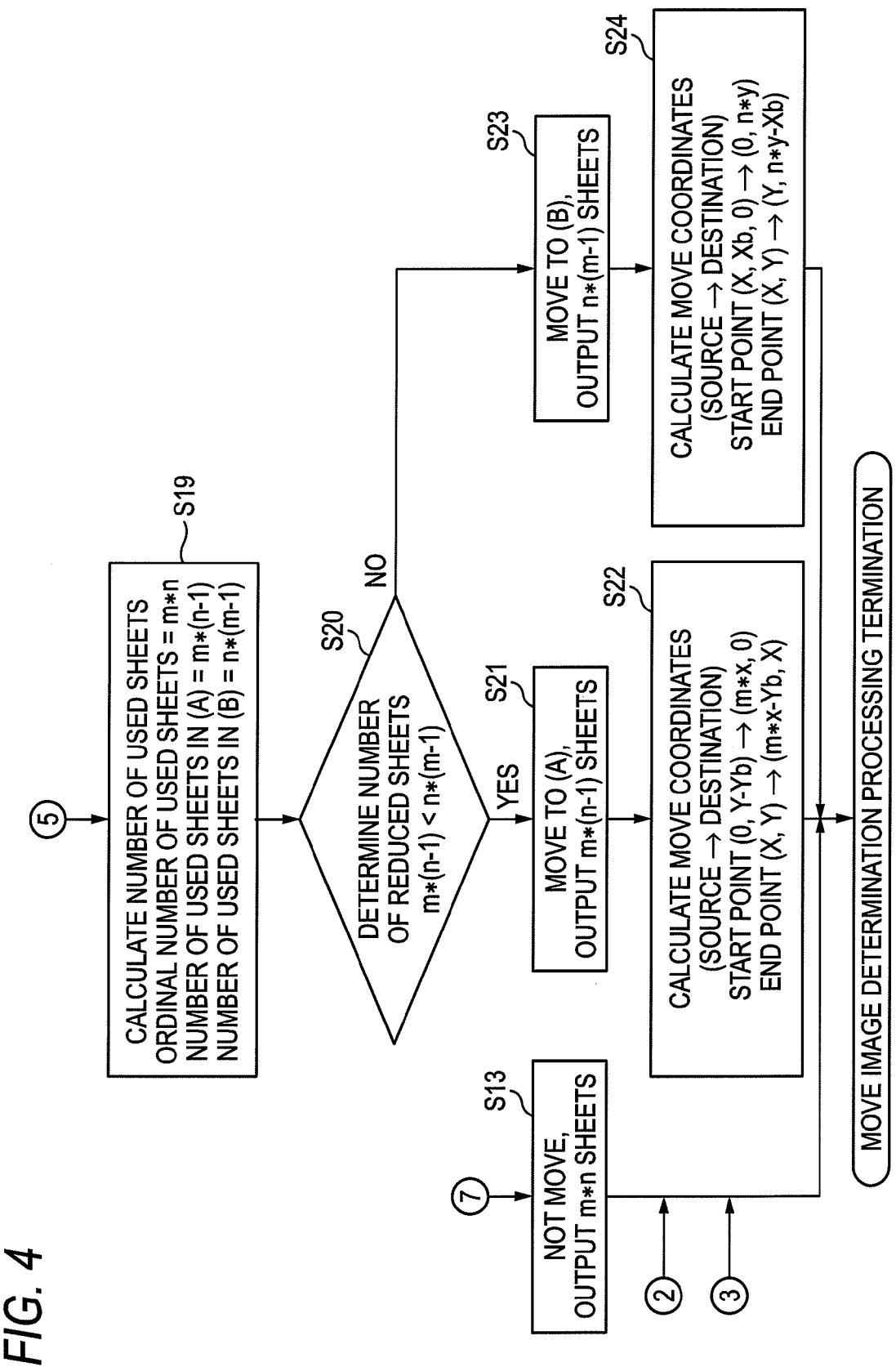
FIG. 4 is a flowchart of the move image determination processing in the image forming apparatus of the embodiment of the invention.
Figure 5:
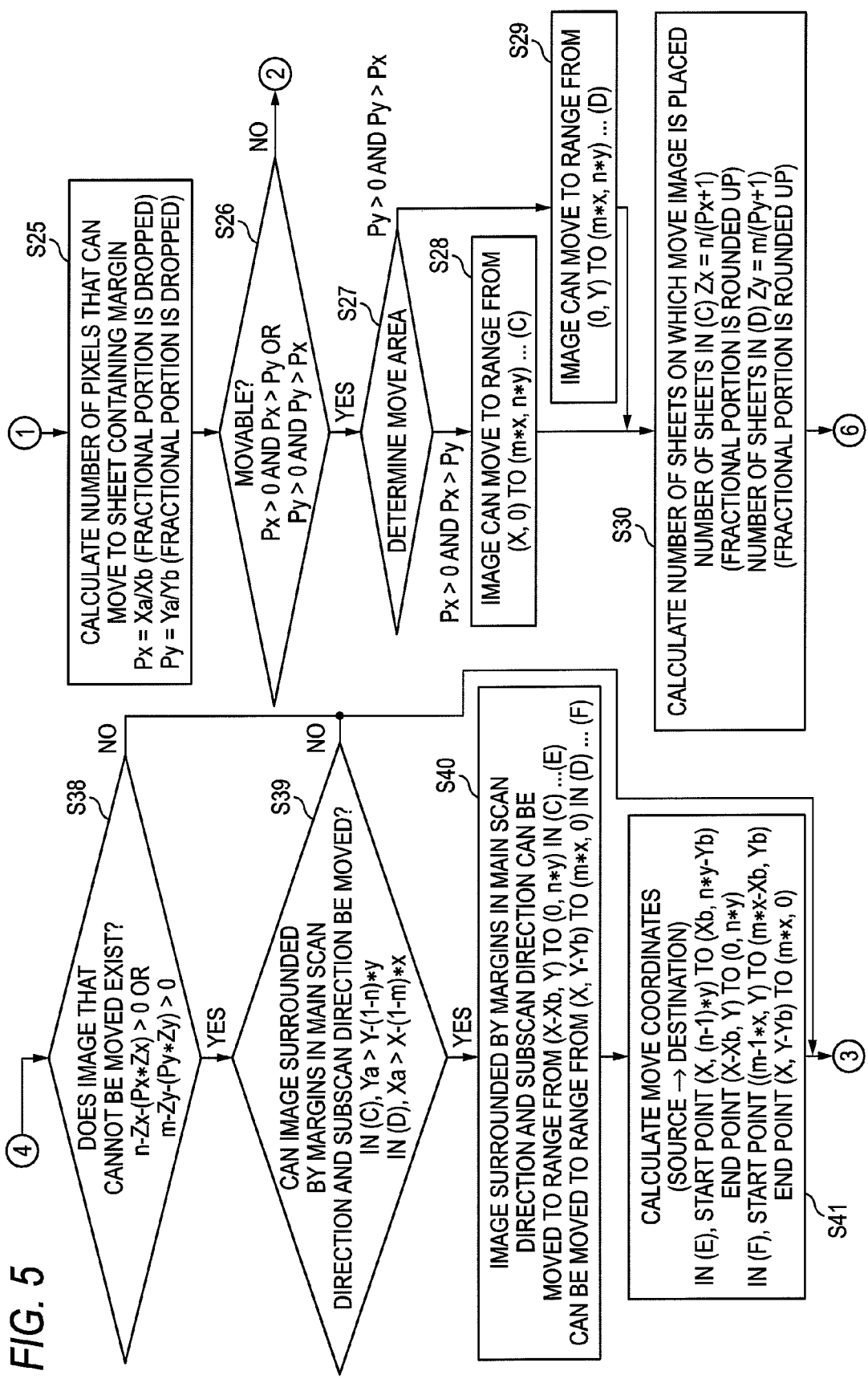
FIG. 5 is a flowchart of the move image determination processing in the image forming apparatus of the embodiment of the invention.
Figure 6:
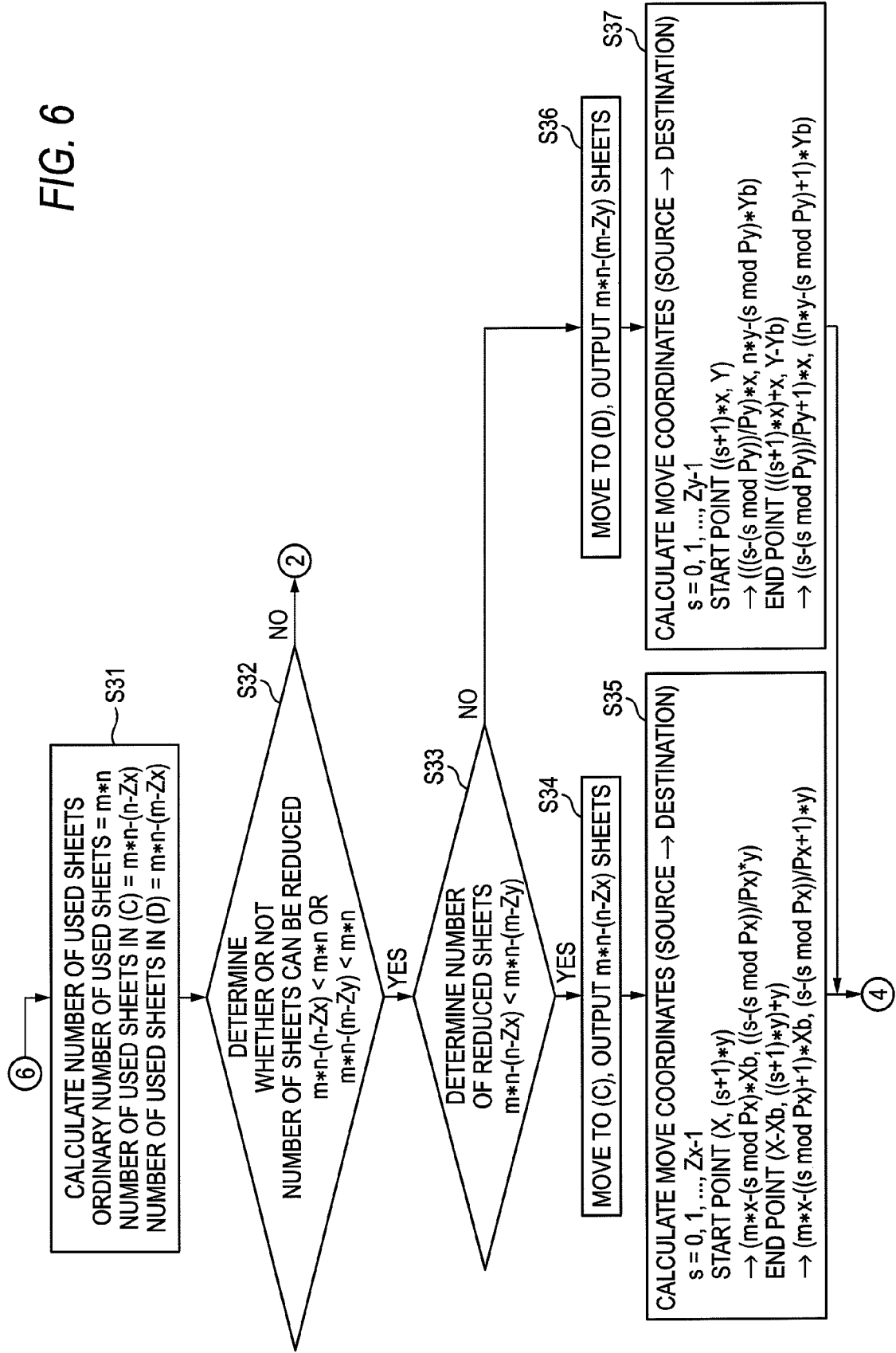
FIG. 6 is a flowchart of the move image determination processing in the image forming apparatus of the embodiment of the invention.

The scale-up continuous print function that can effectively utilize such a blank portion and can form an image with a smaller number of sheets will be discussed below:

FIG. 2 is a flowchart to describe the scale-up continuous print function of the image forming apparatus 1. The scale-up continuous print function is executed based on the control program 12. That is, the operation panel 7 of the image forming apparatus 1 is operated and the scale-up continuous print function is selected, whereby processing in FIG. 2 is started. First, the document size, the scaling factor, the size of the output sheet are set (step S1). Although the user may enter all of them by operating the operation panel 7, the document size may be automatically read through the image reader 3 by known means. If the document size is multiplied by the scaling factor, the size of an output image is found. Thus, if the scaling factor of the document is known and the size of the output sheet is determined, the necessary number of sheets when an image is simply formed by the scale-up continuous print function without executing step S2 described later.

Next, move image determination processing is performed (step S2). Here, if an image is simply formed by the scale-up continuous print function, sheets are consumed fruitlessly and thus processing required for saving the number of sheets is performed by moving a part of an image to a margin area of a sheet. Specifically, determination is made as to which image is to be moved to which area to save a sheet. The processing is described later in detail.

When sheet saving does not made possible (N at step S3) in the move image determination processing (step S2), scan of a document image for scale-up continuous print is executed in the image reader 3 (step S4) and forming the read image is started in the image forming unit 4 (step S5). The scan (step S4) is executed for each of document image areas corresponding to image pieces allocated to sheets when an image is divided and formed on a plurality of sheets. When scan of all image pieces does not terminate (N at step S6), the process returns to step S4 and the remaining image piece is scanned. When scan terminates (Y at step S6), the processing is terminated.

When sheet saving is made possible (Y at step S3), scan of a document image for scale-up continuous print is executed in the image reader 3 (step S7) and the image data of the read image is stored in a memory area of the RAM 14, etc., (step S8). The scan (step S7) is executed for each of document image areas corresponding to image pieces allocated to sheets when an image is divided and formed on a plurality of sheets. When scan of all image pieces does not terminate (N at step S9), the process returns to step S7 and the remaining image piece is scanned. The reason why the image data of the read image is stored in the memory area of the RAM 14, etc., (step S8) is that it becomes necessary to combine image pieces into one image on one sheet when sheet saving is made possible (Y at step S3) according to the move image determination processing (step S2) (as described later in detail). When scan of all image pieces terminates (Y at step S9), forming all image pieces is started in the image forming unit (step S10).

Next, the move image determination processing (step S2) will be discussed in detail. FIGS. 3 to 6 are flowcharts of subroutines of the move image determination processing (step S2).

Figure 7:
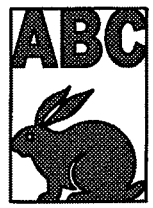
FIG. 7 is a schematic representation to describe the move image determination processing in the image forming apparatus of the embodiment of the invention.
Figure 8:
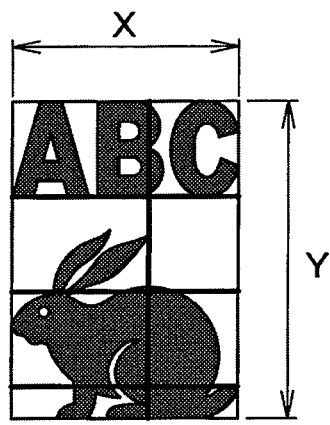
FIG. 8 is a schematic representation to describe the move image determination processing in the image forming apparatus of the embodiment of the invention.
Figure 9:
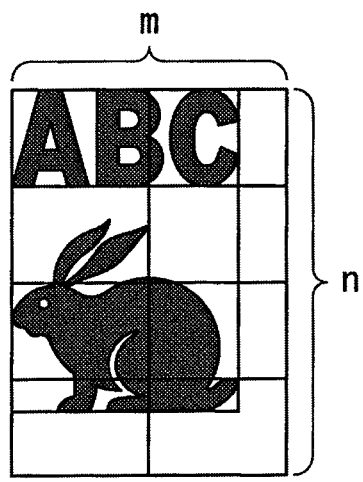
FIG. 9 is a schematic representation to describe the move image determination processing in the image forming apparatus of the embodiment of the invention.
Figure 10:
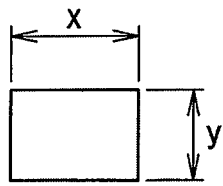
FIG. 10 is a schematic representation to describe the move image determination processing in the image forming apparatus of the embodiment of the invention.
Figure 11:
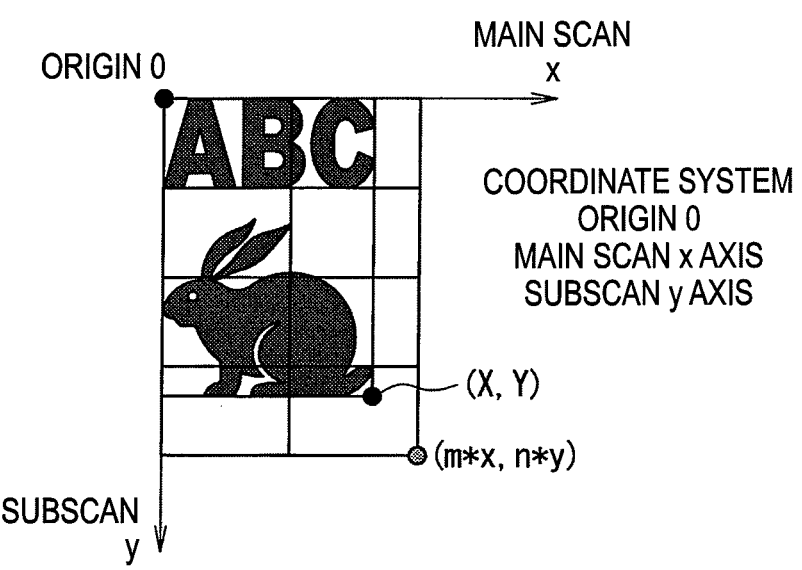
FIG. 11 is a schematic representation to describe the move image determination processing in the image forming apparatus of the embodiment of the invention.

In the description to follow, an original document image is as shown in FIG. 7 by way of example. FIG. 8 shows an image after the original document image is scaled up (width and length sizes are X and Y respectively). FIG. 9 shows an example wherein a plurality of standardized size sheets each smaller than the image after scaled up are arranged and the image is simply fitted to the sheets. Here, the width and length sizes of one standardized size sheet are x and y respectively (FIG. 10). In the example in FIG. 9, it is assumed that m sheets are arranged in width and n sheets are arranged in length, whereby the image after scaled up can be simply fitted. FIG. 11 shows the coordinates of the image after scaled up and the coordinates of the standardized size sheets fitted to the image after scaled up. In FIG. 11, the upper left end of standardized size sheets to which the image after scaled up is fitted is origin 0, a main scan direction is an x axis, and a subscan direction is y axis. In this case, the coordinates of the lower right end of the image after scaled up are (X,Y) and the coordinates of the lower right end of the standardized size sheets are (mXx, nXy).

Figure 12:
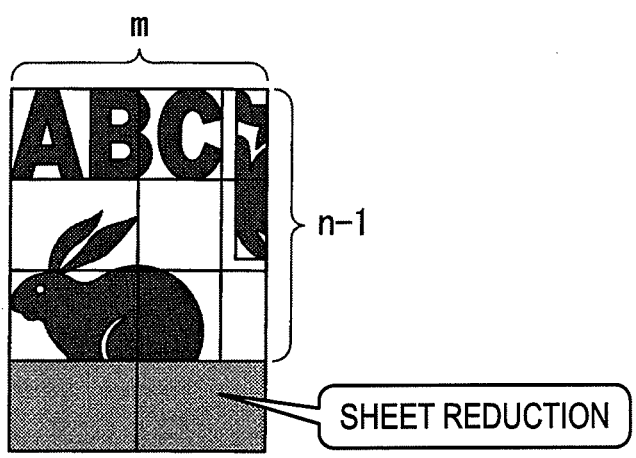
FIG. 12 is a schematic representation to describe the move image determination processing in the image forming apparatus of the embodiment of the invention.

An example of reducing the number of sheets as shown in FIG. 12 by moving an image formed on one standardized size sheet in the example in FIG. 9 to a margin of another sheet will be discussed.

Figure 13:
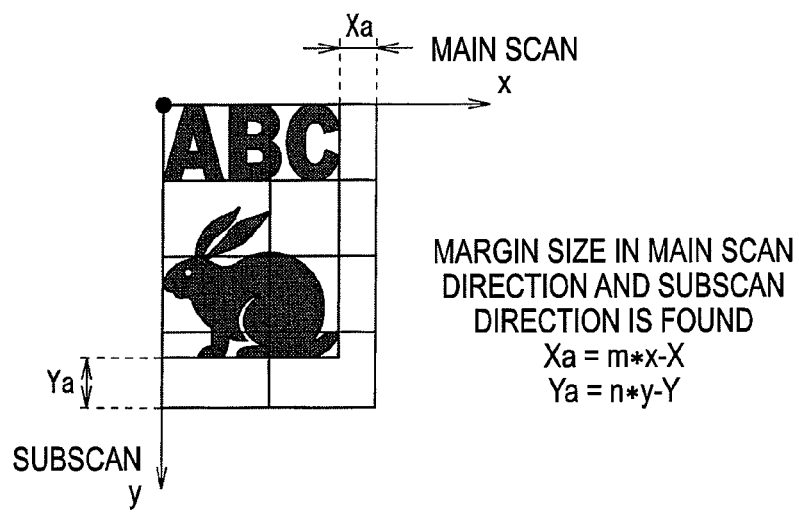
FIG. 13 is a schematic representation to describe the move image determination processing in the image forming apparatus of the embodiment of the invention.

Referring to FIGS. 3 to 6, first the sizes of margins in the main scan direction and the subscan direction of sheets to which the scaled-up image shown in FIG. 9 is fitted. That is, the size of the margin in the main scan direction (width) Xa becomes "Xa=mXx−X" and the size of the margin in the subscan direction (length) Ya becomes "Ya=nXy−Y" (see FIG. 13) (step S11). Whether or not a margin in the main scan direction, the subscan direction occurs, namely, at least either of Xa>0 and Ya>0 holds true is determined (step S12). When a margin does not occur (N at step S12), it is determined that no image is moved and an image is formed on mXn sheets shown in FIG. 9 and is output (step S13) and the processing is terminated. In this case, the determination at step S3 described above is N and step S4 and the later steps are executed.

Figure 14:
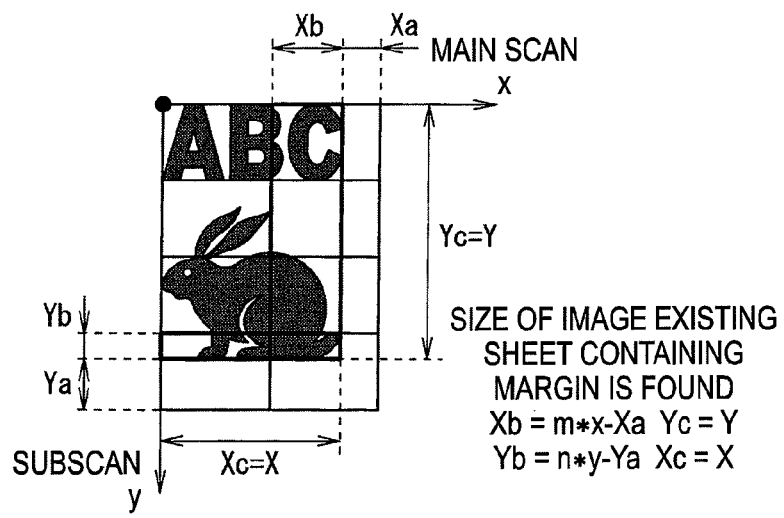
FIG. 14 is a schematic representation to describe the move image determination processing in the image forming apparatus of the embodiment of the invention.

When a margin occurs (Y at step S12), the size of the image existing on the sheet containing the margin is calculated (step S14). That is, letting the sizes of the width and the length of the image existing on the sheet containing the margin be (Xb, Yc) and (Yb, Xc) respectively, "Xb=x−Xa, Yc=Y" and "Yb=y−Ya, Xc=X" (see FIG. 14). Whether or not the image existing on the sheet containing the margin can be moved to a margin of a different sheet is determined (see FIG. 14) (step S15). That is, whether "Xa≥Yb and X≤Y" or "Xb≤Ya and Y≤X" is determined.

Figure 15:
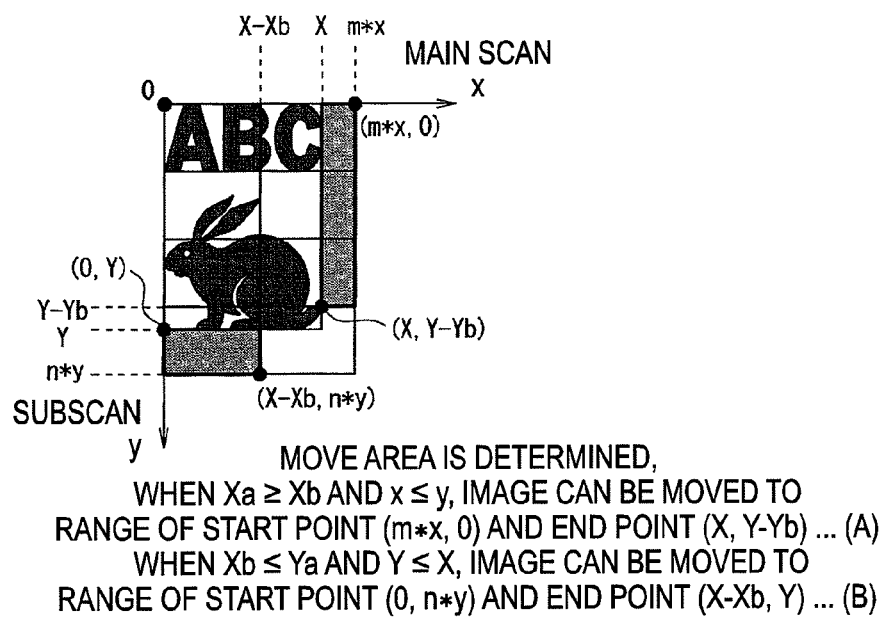
FIG. 15 is a schematic representation to describe the move image determination processing in the image forming apparatus of the embodiment of the invention.

When the image existing on the sheet containing the margin can be moved to a margin of a different sheet (Y at step S15), the area to which the image is to be moved is determined (step S16). That is, the area to which the image is to be moved is separated into (A) (step S17) or (B) (step S18) depending on "Xa≥Yb and X≤Y" or "Xb≤Xa and Y≤X." That is, as shown in FIG. 15, when "Xa≥Yb and X≤Y," the image can be moved to the range of start point (mXx, 0) to end point (X, Y−Yb) (in the case of (A)). When "Xb≤Xa and Y≤X," the image can be moved to the range of start point (0, nXy) to end point (X−Xb, Y) (in the case of (B)). In steps S16 to S18, it seems that alternative of "Xa≥Yb and X≤Y" or "Xb≤Xa and Y≤X" can only exist. However, of course, the case where "Xa≥Yb and X≤Y" and "Xb≤Xa and Y≤X" can exist.

Figure 16:
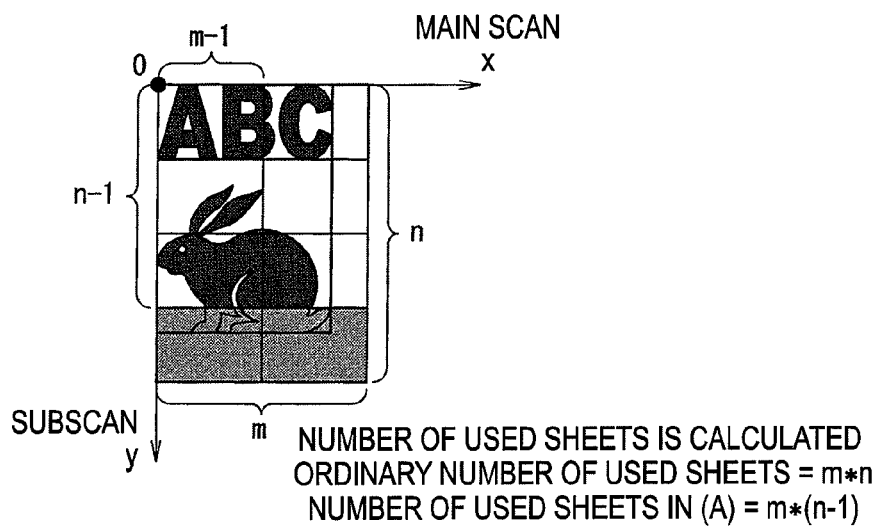
FIG. 16 is a schematic representation to describe the move image determination processing in the image forming apparatus of the embodiment of the invention.
Figure 17:
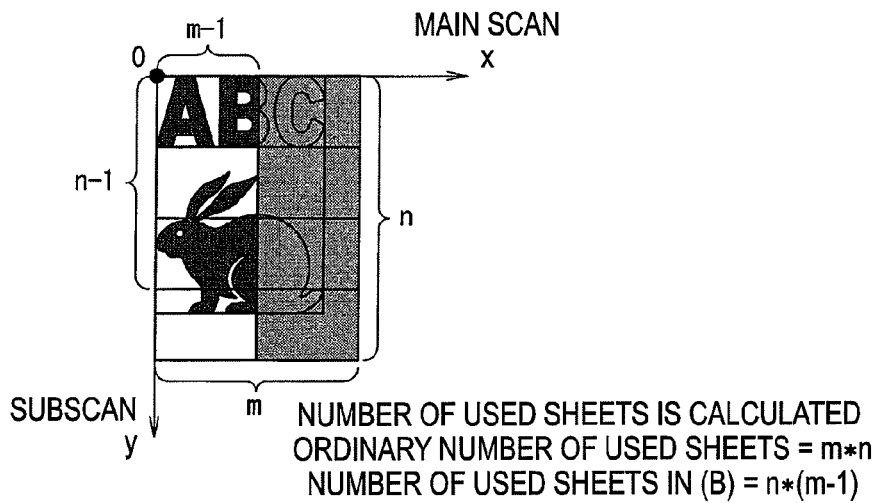
FIG. 17 is a schematic representation to describe the move image determination processing in the image forming apparatus of the embodiment of the invention.

Thus, when determination is made as to which image can be moved to which margin, the number of sheets used when an image is formed in the case of (A) and that in the case of (B) (step S19). That is, when the number of sheets cannot be reduced, the number of used sheets is mXn; the number of used sheets in the case of (A) is "mX(n−1)" and the number of used sheets in the case of (B) is "nX(m−1)" (See FIGS. 16 and 17). If an image cannot be moved in the case of (A), the number of used sheets in the case of (A) is "mXn" rather than "mX(n−1)." If an image cannot be moved in the case of (B), the number of used sheets in the case of (B) is "mXn" rather than "nX(m−1)."

Figure 18:
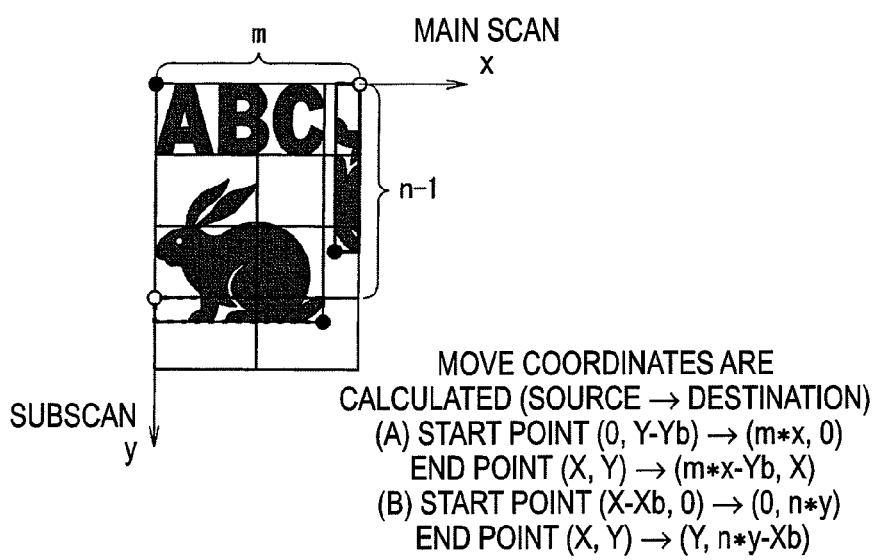
FIG. 18 is a schematic representation to describe the move image determination processing in the image forming apparatus of the embodiment of the invention.

Determination is made as to which of the case (A) and the case (B) a larger number of sheets can be reduced in. That is, whether or not "mX(n−1)<nX(m−1)" is determined. A comparison is made by assuming that if an image cannot be moved in the case of (A), the number of used sheets in the case of (A) is "mXn" rather than "mX(n−1)" and if an image cannot be moved in the case of (B), the number of used sheets in the case of (B) is "mXn" rather than "nX(m−1)." When a larger number of sheets can be reduced in the case of (A) (Y at step S20), an image is moved in the case of (A) and the number of image forming sheets is "mX(n−1)" (step S21). The move coordinates are calculated (step S22). In the example, the start point moves from (0, Y−Yb) to (mXx, 0) and the end point moves from (X, Y) to (mXx−Yb, X). In the examples in FIGS. 16 and 17, a larger number of sheets can be reduced in the case of (A) and thus FIG. 18 shows an example of image move only in the case of (A).

Likewise, when a larger number of sheets can be reduced in the case of (B) (N at step S20), an image is moved in the case of (B) and the number of image forming sheets is "nX(m−1)" (step S23). The move coordinates are calculated (step S24). In the example, the start point moves from (X−Xb, 0) to (0, nXy) and the end point moves from (X, Y) to (Y, nXy−Xb).

On the other hand, if the image existing on the sheet containing the margin cannot be moved to a margin of a different sheet (see FIG. 14) (N at step S15), namely, if "Xa≥Yb and X≤Y" or "Xb≤Xa and Y≤X" does not hold true, whether or not the image can be divided and can move to a margin of a different sheet is determined according to processing at step S25 and the later steps and if the image can be moved, it is moved.

That is, first the number of images that can be moved to the margin of the sheet is determined (step S25). In an example in FIG. 19, how many images in the ranges of Xb and Yb are entered in the ranges of Xa and Ya of margins of the sheet in FIG. 19 is determined by determining "Px=Xa/Xb (fractional portion is dropped) and "Py=Ya/Yb (fractional portion is dropped). Whether or not the image can be moved to the margin portion is determined (step S26). That is, when "Px>0 and Px>Py" or "Py>0 and Py>Px," the image can move. When the image cannot move to the margin portion (N at step S26), the process goes to step S13.

When the image can move to the margin portion (Y at step S26), which area of the margin is determined (step S27). That is, as shown in FIG. 20, when "Px>0 and Px>Py," the image can move to the range from (X, 0) to (mXx, nXy) (in the case of (C)) (step S28). On the other hand, as shown in FIG. 21, when Py>0 and Py>P," the image can move to the range from (0, Y) to (mXx, nXy) (in the case of D) (step S29).

Next, as shown in FIGS. 20 and 21, the number of sheets on which the move image is placed is calculated (step S30). That is, in the case of (C), the number of sheets Zx is "Zx=n/(Px+1) (fractional portion is rounded up). In the case of (D), the number of sheets Zy is "Zy=m/(Py+1) (fractional portion is rounded up).

Next, as shown in FIGS. 20 and 21, the number of sheets used to form the image is calculated (step S31). The number of used sheets in FIG. 9 becomes "mXn;" the number of used sheets in the case of (C) becomes "mXn−(n−Zx)" and the number of used sheets in the case of (D) becomes "mXn−(m−Zy)."

Whether or not the number of sheets can be reduced in the case of (C), in the case of (D) as compared with the number of used sheets in FIG. 9 "mXn" is determined (step S32). That is, if "mXn−(n−Zx)<mXn" or "mXn−(m−Zy)<mXn," the number of sheets can be reduced as compared with "mXn" sheets. When the number of sheets can be reduced (Y at step S32), the process goes to S33. When the number of sheets cannot be reduced (N at step S32), the process goes to S13.

At step S33, the number of sheets in the case of (C) and that in the case of (D) are determined as to which case a larger number of sheets can be reduced in. That is, if mXn−(n−Zx)<mXn−(m−Zy) (Y at step S33), the number of reduced sheets is larger in the case of (C) and the image is moved in the case of (C) shown in FIG. 20. In this case, it is determined that image is formed and output to "mXn−(n−Zx)" sheets (step S34). If mXn−(n−Zx)≥mXn−(m−Zy)" (N at step S33), the image is moved in the case of (D) shown in FIG. 21. In this case, it is determined that image is formed and output to "mXn−(m−Zy)" sheets (step S36).

Next, the image move coordinates are calculated (see FIG. 22) (steps S35 and S37). First, in the case of (C), "s=0, 1, . . . , Zx−1" and the start point is moved from (X, (s+1)Xy) to (mXx−(s mod Px)XXb, ((s−(s mod Px))/Px)Xy) and the end point is moved from (X−Xb, ((s+1)Xy)+y) to (mXx−((s mod Px)+1)XXb, (s−(s mod Px))/Px+1)Xy). Next, in the case of (D), "s=0, 1, . . . , Zy−1" and the start point is moved from ((s+1)Xx, Y) to (((s−(s mod Py))/Py)Xx, nXy−(s mod Py)XYb) and the end point is moved from (((s+1)Xx)+x, Y−Yb) to ((s−(s mod Py))/Py+1)Xx, ((nXy−(s mod Py)+1)XYb).

It is determined that the image is divided and the image piece is moved to the margin of the different sheet according to the processing at steps S25 to S37. In processing at step S38 and the later steps, whether or not image can be further moved and the number of sheets can be reduced.

First, whether or not an image that cannot be moved according to the processing at steps S25 to S37 exists is determined (step S38). That is, whether or not "n−Zx−(PxXZx)>0" or "m−Zy−(PyXZy)>0" holds true is determined. When an image that cannot be moved does not exist (N at step S38), the processing is terminated.

When an image that cannot be moved exists (Y at step S38), whether or not an image surrounded by margins in the main scan direction and the subscan direction can be moved is determined (step S39). In the case of (C) described above, the image can be moved to the range from (X−Xb, Y) to (0, nXy). In the case of (D) described above, the image can be moved to the range from (X, Y−Yb) to (mXx, 0). When the image cannot be moved (N at step S39), the processing is terminated.

Where the mage surrounded by margins in the main scan direction and the subscan direction can be moved to is determined (see FIG. 23) (step S40). That is, in the case of (C), the image can be moved to the range from (X−Xb, Y) to (0, nXy) (the case of (E)). In the case of (D), the image can be moved to the range from (X, Y−Yb) to (mXx, 0) (the case of (F)).

Last, the move coordinates of the image to be moved are calculated (step S41). That is, in the case of (E), the start point can be moved from (X, (n−1)Xy) to (Xb, nXy−Yb) and the end point cab be moved from (X−Xb, Y) to (0, nXy). In the case of (F), the start point can be moved from ((m−1Xx, Y) to (mXx−Xb, Yb) and the end point cab be moved from (X, Y−Yb) to (mXx, 0).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an image forming unit which forms an image on a print medium; and
    a control unit which controls the image forming unit to divide an image larger than the print medium into a plurality of image pieces which include a first image piece and a second image piece to be formed on a plurality of print media;
    a determination unit which determines whether the first image piece to be formed on a first print medium having a first margin from among the plurality of print media can be moved into a second margin of a second print medium based on a size of the first image piece and a size of the second margin,
    wherein the control unit controls the image forming unit to move only the first image piece into the second margin in response to the determination unit determining that the first image piece is smaller in size than the second margin.

2. The image forming apparatus according to claim 1, wherein
    the control unit controls the image forming unit so that the first image piece is formed on the second print medium in response to the control unit moving the first image piece into the second margin.

3. An image forming method performed by an image forming apparatus, the method comprising
    dividing, performed by the image forming apparatus, an image larger than a print medium into a plurality of image pieces which include a first image piece and a second image piece to be formed on a plurality of print media;
    determining, performed by the image forming apparatus, whether the first image piece to be formed on a first print medium having a first margin from among the plurality of print media can be moved into a second margin of a second print medium based on a size of the first image piece and a size of the second margin; and
    moving, performed by the image forming apparatus, only the first image piece into the second margin in response to determining that the first image piece is smaller in size than the second margin.

4. A non-transitory computer-readable medium storing a program that causes an image forming apparatus to execute image forming, the image forming comprising:
    controlling image forming unit which forms an image on a print medium to divide an image larger than the print medium into a plurality of image pieces which include a first image piece and a second image piece to be formed on a plurality of print media;
    determining whether the first image piece to be formed on a first print medium having a first margin from among the plurality of print media can be moved into a second margin of a second print medium based on a size of the first image piece and a size of the second margin; and
    controlling the image forming unit to move the only first image piece into the second margin in response to determining that the first image piece is smaller in size than the second margin.

5. The image forming apparatus according to claim 1, wherein the determination unit determines whether the second image piece to be formed on the second print medium can be moved into the first margin based on the size of the size of the second image piece and the size of the first margin.

6. The image forming apparatus according to claim 5, wherein in response to the determination unit determining that the second image piece is smaller in size than the size of the first margin, the determination unit determines that the second image piece is movable into the first margin.

7. The image forming apparatus according to claim 6, wherein in response to the determination unit determining that both of the first image piece and the second image piece are movable into the second margin and the first margin, respectively, the determination unit determines a first number of print mediums which can be saved by moving only the first image piece into the second margin, and a second number of print mediums which can be saved by moving only the second image piece into the first margin.

8. The image forming apparatus according to claim 7, wherein in response to determining that the second number is greater than the first number, the control unit moves the second image piece from the second print medium into the first margin and refrains from moving the first image piece from the first print medium into the second margin.

9. The image forming apparatus according to claim 6, wherein in response to the determination unit determining that both of the first image piece and the second image piece are movable into the second margin and the first margin, respectively, the determination unit determines a first number of print mediums which will be used by moving only the first image piece into the second margin, and a second number of print mediums will be used by moving only the second image piece into the first margin.

10. The image forming apparatus according to claim 7, wherein in response to determining that the second number is less than the first number, the control unit moves the second image piece from the second print medium into the first margin and refrains from moving the first image piece from the first print medium into the second margin.

11. An image forming apparatus comprising:
    an image forming unit which forms an image on a print medium; and a control unit which controls the image forming unit to divide an image larger than the print medium into a plurality of image pieces which include a first image piece and a second image piece to be formed on a plurality of print media;

a determination unit which determines whether the first image piece to be formed on a first print medium having a first margin from among the plurality of print media can be moved into a second margin of a second print medium based on a size of the first image piece and a size of the second margin, wherein the control unit controls the image forming unit to move the first image piece into the second margin in response to the determination unit determining that the first image piece is smaller in size than the second margin, wherein the determination unit determines whether the second image piece to be formed on the second print medium can be moved into the first margin based on the size of the size of the second image piece and the size of the first margin, wherein in response to the determination unit determining that the second image piece is smaller in size than the size of the first margin, the determination unit determines that the second image piece is movable into the first margin, and wherein in response to the determination unit determining that both of the first image piece and the second image piece are movable into the second margin and the first margin, respectively, the determination unit determines a first number of print mediums which can be saved by moving only the first image piece into the second margin, and a second number of print mediums which can be saved by moving only the second image piece into the first margin.

12. The image forming apparatus according to claim 11, wherein in response to determining that the second number is greater than the first number, the control unit moves the second image piece from the second print medium into the first margin and refrains from moving the first image piece from the first print medium into the second margin.

13. The image forming apparatus according to claim 11, wherein in response to determining that the second number is less than the first number, the control unit moves the second image piece from the second print medium into the first margin and refrains from moving the first image piece from the first print medium into the second margin.

14. An image forming apparatus comprising:

an image forming unit which forms an image on a print medium; and a control unit which controls the image forming unit to divide an image larger than the print medium into a plurality of image pieces which include a first image piece and a second image piece to be formed on a plurality of print media;

a determination unit which determines whether the first image piece to be formed on a first print medium having a first margin from among the plurality of print media can be moved into a second margin of a second print medium based on a size of the first image piece and a size of the second margin, wherein the control unit controls the image forming unit to move the first image piece into the second margin in response to the determination unit determining that the first image piece is smaller in size than the second margin, wherein the determination unit determines whether the second image piece to be formed on the second print medium can be moved into the first margin based on the size of the size of the second image piece and the size of the first margin, wherein in response to the determination unit determining that the second image piece is smaller in size than the size of the first margin, the determination unit determines that the second image piece is movable into the first margin, and wherein in response to the determination unit determining that both of the first image piece and the second image piece are movable into the second margin and the first margin, respectively, the determination unit determines a first number of print mediums which will be used by moving only the first image piece into the second margin, and a second number of print mediums will be used by moving only the second image piece into the first margin.

* * * * *